July 23, 1968  O. W. NEUMARK  3,393,885
PARACHUTES
Filed May 31, 1966
2 Sheets-Sheet 1
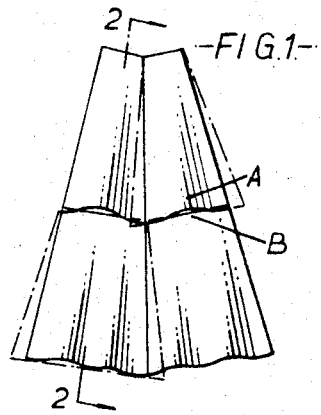
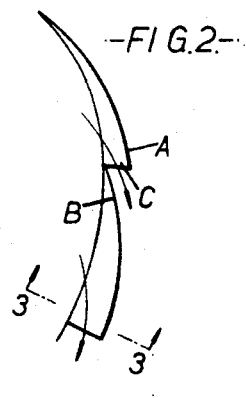
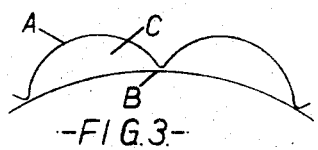
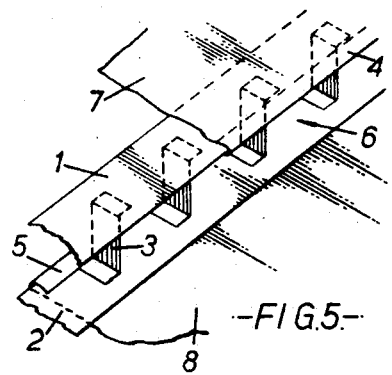
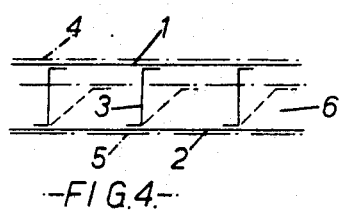
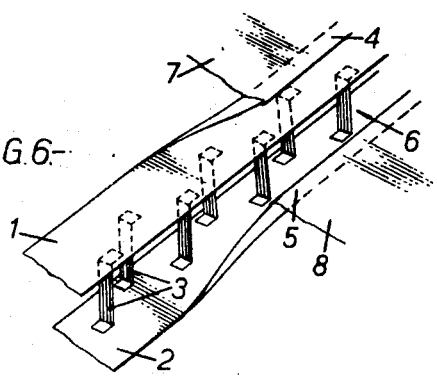
OTTO W. NEUMARK
INVENTOR:
BY
Sperry and Zoda July 23, 1968　　　O. W. NEUMARK　　　3,393,885
PARACHUTES
Filed May 31, 1966　　　　　　　　　　　　2 Sheets-Sheet 2
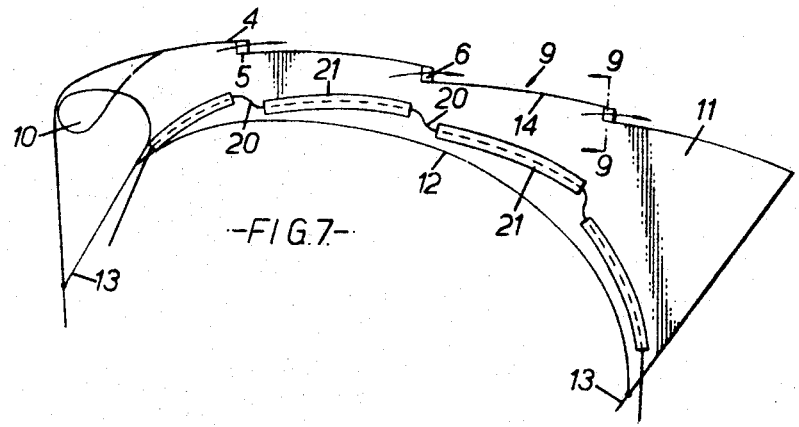
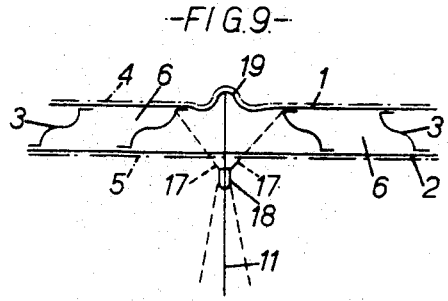
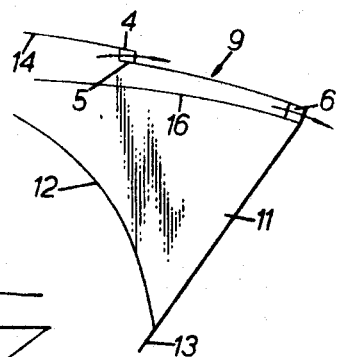
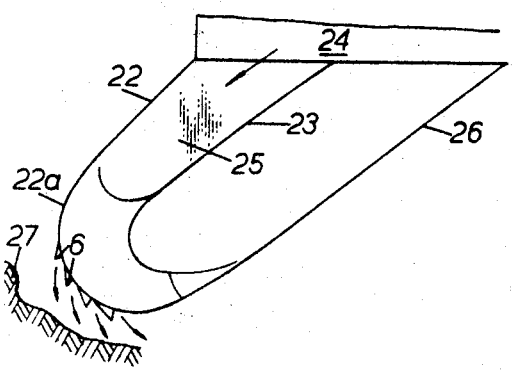
OTTO W. NEUMARK
INVENTOR:
BY
Sperry and Zoda

United States Patent Office 3,393,885
Patented July 23, 1968

3,393,885
PARACHUTES
Otto W. Neumark, 2 Churwell Ave., Heaton Mersey,
Stockport, England
Filed May 31, 1966, Ser. No. 554,187
9 Claims. (Cl. 244—145)

ABSTRACT OF THE DISCLOSURE

A parachute or other inflatable flexible construction having a slot therein for efflux of air through the slot wherein the adjacent edges of the slot are preferably arranged in overlapping relation and slot shaping means are provided for maintaining the width of the slot substantially uniform throughout the major portion of the length of the slot. The slot shaping means illustrated are in the form of parallel webs of reinforcing material secured to the flexible material of the inflatable construction adjacent the edges of the slot and having one or more spaced connecting or cross straps secured thereto for maintaining the reinforcing webs in substantially parallel relation upon relative longitudinal movement of said webs with respect to each other as the slot is opened and closed.

---

The present invention relates to improvements in aerodynamic slots in flexible fabric or other membranes made up into parachutes, kites, sails, sail wings, inflated wings and the flexible inflated structure and skirts of air-cushion or ground-effect machines.

The present invention can best be appreciated by first reviewing tthe Lemoigne slots of U.S. Patent No. 3,099,426 which are used in certain parachutes and then outlining the improvements which the present invention provides over this known device.

Lemoigne slots are produced by the opening, on deployment of a parachute, of slits formed in its canopy and each reinforced along both edges by tape or webbing. These slots are so orientated as to direct air from the inner to the outer surface of the canopy along flow paths whose horizontal components have a common general direction and hence tend to impart horizontal motion to the parachute in the opposite direction during its descent.

The air efflux from the several slots, by flushing the outer surface of the canopy, reduces the size of the turbulent eddies and promotes a more even aerodynamic flow over such surface with correspondingly greater lift. This applies particularly when any part of the canopy is at a high angle of attack to the local airstream, and helps to reduce the amount of "stalling" or transition from laminar flow to turbulent eddy breakaway.

Since what becomes the outer edge of each slot during the aforesaid air efflux is made longer than the inner edge, such slot becomes crescent-shaped in cross-section and hence inefficient for the maintenance of laminar flow over the adjacent canopy surface, because the speed of air efflux is very low in the cusps of the crescent and very high at its central part.

A further characteristic of slots with crescent-section effluxes is that they can invert and cause a reversal of airflow, which is highly undesirable for most applications.

The object of the present invention is to provide an improved slot which, by allowing a more uniform air efflux than the known device aforesaid, will produce a better aerodynamic flow over the outer surface of the membrane immediately downstream thereof.

According to this invention, an aerodynamic slot in a flexible membrane is characterised in that the edges thereof are interconnected at a plurality of positions by slot shaping members so that its width under operative conditions is uniform over the whole, or substantially the whole, of its length.

Conveniently the interconnections between the slot edges are constituted by the cross-straps of a so-called "ladder webbing" whose two main webs are secured along such edges and preferably staggered relatively to one another.

Thanks to the aforesaid interconnections of the slot shaping members the edges of the improved slot are incapable of inversion, whilst its aperture can readily be reduced in width or effectively closed by causing relative longitudinal movement of its two edges in any suitable manner.

In the accompanying drawings,

FIG. 1 is a fragmentary plan view of a parachute canopy with Lemoigne slots,

FIG. 2 is a section on the line 2—2 of FIG. 1 when the canopy is inflated, and

FIG. 3 is a section on the line 3—3 of FIG. 2,

FIG. 4 is a view corresponding to FIG. 3, showing one form of the improved slot in fully-open and partially-closed conditions, FIG. 5 is a fragmentary perspective view of the slot shown in FIG. 4, and FIG. 6 is a similar view showing a modification, FIG. 7 is a sectional side elevation showing the invention applied to a parachute of "sail-wing" type, FIG. 8 is a fragmentary view corresponding to FIG. 7 but showing a modification, FIG. 9 is a section on the line 9—9 of FIG. 7 illustrating one method of controlling the slot width, and FIG. 10 is a further fragmentary cross-section showing the invention applied to an air-cushion or ground-effect machine.

In producing each of the known Lemoigne slots illustrated in FIGS. 1 to 3, the edge A of one of two juxtaposed panels of a parachute canopy is made longer than the meeting edge B of the other panel, the flat shape of the first-mentioned panel being indicated in broken lines. The two edges A, B are left free of one another and suitably reinforced to define an air-efflux aperture C which, when the canopy is inflated (FIG. 2) assumes the crescent section shown in FIG. 3.

It will readily be understood that surface frictional forces on the airflow through this slot C increase progressively from its central portion to its cusps, so that the air speeds at different positions along the slot vary over a wide range with resultant turbulence.

The improved slot, one example of which is illustrated in FIGS. 4 and 5, avoids the production of such turbulence, inasmuch as it is constrained to a substantially uniform width by interconnection of its edges at a number of positions along its length.

In the convenient arrangement shown, the constraint is applied by means of a so-called "ladder webbing" such as is used for example, to support and control the slats of a venetian blind.

Such ladder webbing is produced as a three-ply fabric on a multi-bank loom, whose several shuttles are arranged to weave two main webs 1, 2 simultaneously with at least one intervening narrow web which is integrated with the main webs alternately at regular intervals and interrupted midway of each such attachment to produce a series of cross-straps 3.

The main webs are sewn respectively along the outer and inner edges 4, 5 of a slot 6 between two juxtaposed canopy panels 7, 8 so that the row of cross-straps 3 controls the maximum width of such slot and lie in planes parallel to the direction of efflux of air through the slot as shown in FIG. 5.

The cross-straps 3 may be arranged medially of the main webs 1, 2 as shown in FIG. 5, but to facilitate attachment of the latter to the panels 7, 8 it is preferred to weave them in laterally-staggered relation as shown in FIG. 6.

Instead of a single row of cross-straps, the ladder webbing may be woven with two such rows spaced apart side-by-side and mutually staggered as also shown in FIG. 6. Each of the cross-straps 3 in this arrangement may be relatively narrow as compared with the single row of FIG. 5 which allows a wider overlap of the slot edges 4, 5 without increase of weight.

FIG. 7 illustrates the application to the invention to a multi-lobe "sail-wing" 9 of high aspect-ratio which has an air-filled bulbous leading edge 10 and whose lobes are constrained to an aerofoil configuration in side elevation by attachment along their lateral edges to pendant fabric webs 11, the free edge of each such web having a substantially parabolic profile and containing a tension cord 12 which emerges as fore-and-aft rigging lines 13.

One or more lobes of the "sail-wing" 9 consist of or incorporates a series of panels whose juxtaposed edges 4, 5 overlap one another as shown, the attached profiles 14 of the adjacent pendant webs 11 being stepped so that each pair of overlapping panel edges define one of the controllable slots 6 aforesaid.

The effect of the slots may be augmented by providing each lobe with a curved lower surface 16 (FIG. 8) which extends between the adjacent pendant webs 11 and cooperates with one of the upper-surface panels to define a slot 6 at the trailing edge of the "wing."

A parachute of the form just described can be launched and sustained in flight in the manner of a kite, and may be utilized (for example) for towing watercraft or land vehicles.

In each of the constructions above described, closure of the slots 6 to any desired extent is effected by displacing the edges 4, 5 relatively to one another in a lengthwise direction.

FIG. 9 shows one method applied to the "sail-wing" of FIG. 7 in which cords 17 attached to the main web 1 reinforcing the upstream edges 4 of two adjacent slots 6 are led through an eyelet 18 in the intervening pendant web 11 so that a pull thereon draws the edges 4 inwards, leaving an upstanding fold 19 at the position of such web.

This fold 19 is not seriously disadvantageous, but if desired it may be eliminated by tensioning a cord 20 which passes through a tunnel 21 provided on the pendant web 11 and having a profile corresponding to the initially-stepped edge 14 of the latter (see FIG. 7).

In a modification the web edge just mentioned has a continuous aerofoil curvature and the lobe panels are sewn directly thereto, the upstream edge 4 being longer than the downstream edge 5 of each slot 6 so that the latter has a cross-section similar to that shown in FIG. 3. With such an arrangement the slot will of course only be of constant width over some 80 or 90 percent of its length.

The invention is also advantageously applicable to the inflatable skirts of air-cushion or ground-effect machines, one example of which is shown in FIG. 10.

The skirt in this case has outer and inner surfaces 22, 23 between which an air pressure is maintained by fans mounted in or on the rigid central section 24, flexible webs 25 connecting these skins at intervals and also extending to the lower parts 22a of the outer skin, which are constrained to an inward curvature by cables 26 leading to the central section 24.

Slots 6 according to the present invention are provided between juxtaposed panels arranged between the webs 25 to form the skirt parts 22a, such slots directing curtains of air downwardly and inwardly as shown, and also allowing escape of any collected water. The inner skin 23 may terminate short of the periphery of the outer skin 22 as shown, or may be united to such periphery so that the two skins form an inflatable mattress.

It will be appreciated that the air efflux from the slots 6 causes a build-up of pressure between the skirt and any adjacent article such as 27, thereby reducing the pressure differential between the inner and outer sides of the skirt and hence the tension in the membranes forming the latter. The slots 6 may also be regarded as providing "air lubrication" between the skirt and the obstacle and assisting the skirt to clear the latter without damage.

I claim:

1. A flexible inflatable construction having a slot therein permitting efflux of air through the slot from one surface of the inflatable construction to the other, slot shaping means carried by the inflatable construction for maintaining the width of the slot substantially uniform throughout the major portion of the length of the slot, said slot shaping means comprising a web of material secured to the inflatable construction adjacent one edge of said slot and a second web of material secured to the inflatable construction adjacent the opposite edge of said slot, cross straps which are of substantially equal length extending from one of said webs to the other said cross straps being located in planes parallel to the direction of efflux of air through the slot upon inflation of the construction and arranged in spaced relation longitudinally of the webs, said webs of material being longitudinally movable with respect to each other upon inflation of said construction and said cross straps serving to maintain said webs in substantially parallel relation upon such relative longitudinal movement of the webs to maintain the width of said slot substantially uniform throughout the major portion of the length thereof as the slot is opened and closed.

2. A flexible inflatable construction as defined in claim 1 wherein the material at the opposite edges of said slot project into overlapping relation to define a slot through which air will flow in a predetermined direction upon inflation of said construction.

3. A flexible inflatable construction as defined in claim 1 wherein the webs of material secured to the inflatable construction adjacent the opposite edges of said slot serve to reinforce the flexible construction adjacent said edges and impart a substantially smooth outer surface to the inflatable construction when said slot is closed.

4. A flexible inflatable construction as defined in claim 1 wherein a plurality of spaced substantially parallel slots having slot shaping means are located within the inflatable construction.

5. A flexible inflatable construction as defined in claim 1 comprising juxtaposed panels whose adjacent edges define an aerodynamic slot, a ladder webbing consisting of two superimposed main webs integrated with cross-straps at regular intervals, said main webs being united respectively to said panel edges and said cross-straps constraining said slot to a constant width over at least substantially the whole length thereof when said membrane is air-supported.

6. A flexible inflatable construction as defined in claim 2 comprising juxtaposed panels whose adjacent edges define an aerodynamic slot, a ladder webbing consisting of two superimposed main webs mutually offset in a lateral direction and having their overlapped portions integrated with cross-straps at regular intervals, said main webs being united respectively to said panel edges and said cross-straps constraining said slot to a constant width over at least substantially the whole length thereof when said membrane is air-supported.

7. A flexible inflatable construction as defined in claim 2 comprising juxtaposed panels whose adjacent edge define an aerodynamic slot, reinforcing webs secured along opposite edges of said slot, at least two staggered rows of flexible cross-straps in spaced side-by-side relation and integrated with mutually-overlapped parts of said reinforcing webs to form therewith a prefabricated ladder webbing, said cross-straps constraining said slot to a constant width over at least substantially the whole length thereof when said membrane is air-supported.

8. A flexible inflatable construction as defined in claim 1 comprising juxtaposed panels whose adjacent edges define an aerodynamic slot, a plurality of flexible members connecting said panel edges at intervals along the length of said slot and adapted, when said membrane is air-supported, to constrain said slot to a constant width over at least substantially the whole length thereof, means for causing relative longitudinal movement of said panel edges to reduce the width of said slot.

9. A flexible inflatable construction as defined in claim 1 comprising juxtaposed panels whose adjacent edges define an aerodynamic slot, a plurality of flexible members connecting said panel edges at intervals along the length of said slot and adapted, when said membrane is air-supported, to constrain said slot to a constant width over at least substantially the whole length thereof, a flexible traction member anchored to the outer edge of said slot, a guide connected to the inner edge of said slot at a position offset lengthwise of the latter from the point of anchorage of said traction member so that a pull on said traction member reduces the width of said slot.

References Cited

UNITED STATES PATENTS

| | | | |
|---|---|---|---|
| 2,759,694 | 8/1956 | Lemoigne | 244—145 |
| 2,774,561 | 12/1956 | Finken | 244—145 |
| 3,285,546 | 11/1966 | Jalbert | 244—145 |

FOREIGN PATENTS

| | | |
|---|---|---|
| 874,034 | 7/1942 | France. |
| 583,027 | 8/1933 | Germany. |

FERGUS S. MIDDLETON, *Primary Examiner.*

R. A. DORNON, *Assistant Examiner.*